US011125554B2

(12) United States Patent
Ling et al.

(10) Patent No.: US 11,125,554 B2
(45) Date of Patent: Sep. 21, 2021

(54) REFERENCE-LEVEL GEAR HELIX ARTIFACT

(71) Applicant: DALIAN UNIVERSITY OF TECHNOLOGY, Liaoning (CN)

(72) Inventors: Siying Ling, Liaoning (CN); Yilei Chen, Liaoning (CN); Ming Ling, Liaoning (CN); Huiyang Zhang, Liaoning (CN); Xiaodong Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 172 days.

(21) Appl. No.: 16/622,081

(22) PCT Filed: Jul. 16, 2019

(86) PCT No.: PCT/CN2019/096137
§ 371 (c)(1),
(2) Date: Dec. 12, 2019

(87) PCT Pub. No.: WO2020/057239
PCT Pub. Date: Mar. 26, 2020

(65) Prior Publication Data
US 2020/0309519 A1    Oct. 1, 2020

(30) Foreign Application Priority Data
Sep. 17, 2018 (CN) .......................... 201811078252.0

(51) Int. Cl.
*G01B 21/00* (2006.01)
*G01B 21/04* (2006.01)
(52) U.S. Cl.
CPC .................... *G01B 21/042* (2013.01)
(58) Field of Classification Search
CPC .................................................. G01B 21/042
(Continued)

(56) References Cited

U.S. PATENT DOCUMENTS 2,563,910 A * 8/1951 Bean ........................ G01B 5/20
33/501.19
2,697,283 A * 12/1954 Leuthold .................. G01B 5/20
33/501.14
(Continued)

FOREIGN PATENT DOCUMENTS

CN    102927939 A    2/2013
CN    104655080 A    5/2015
(Continued)

OTHER PUBLICATIONS

China National Standard, The Helix Artifact of Gear, GB\T 6468-2010, Jan. 10, 2011 (8 pages).

*Primary Examiner* — George B Bennett
(74) *Attorney, Agent, or Firm* — Muncy, Geissler, Olds & Lowe, P.C.

(57) ABSTRACT

A reference-level gear helix artifact for transferring gear helix value. The invention provides a reference-level gear helix artifact with a global symmetrical structure that can be easily obtained by generating method. The centroid point of the artifact passes through the geometric center of the artifact mandrel. The cylinder of the reference-level gear helix artifact is provided with the straight tooth groove, the left-hand tooth groove and the right-hand tooth groove, axial reference torus and radial reference cylinder, fine tooth threads and center holes. Among them, the straight tooth groove includes a pair of involute cylindrical surfaces with opposite 0° helix angle, the left-handed tooth groove includes a involute helicoidal surface with 15° and a involute helicoidal surface with 30°, and the right-hand tooth groove includes a involute helicoidal surface with 15° and a involute helicoidal surface with 30°.

6 Claims, 3 Drawing Sheets

(58) Field of Classification Search
USPC .................................................. 33/501.7, 502
See application file for complete search history.

(56) References Cited

U.S. PATENT DOCUMENTS

| | | | | |
|---|---|---|---|---|
| 4,182,045 | A * | 1/1980 | Bosch | G01B 5/0009 33/501.9 |
| 4,285,133 | A * | 8/1981 | Sterki | G01B 21/20 33/1 M |
| 4,488,359 | A * | 12/1984 | Misson | G01M 13/021 33/501.8 |
| 5,083,458 | A * | 1/1992 | DeGeorge | G01M 13/021 33/501.17 |
| 5,271,271 | A * | 12/1993 | Frazier | G01M 13/021 33/501.13 |
| 6,874,241 | B2 * | 4/2005 | Och | G01B 5/202 33/501.16 |

FOREIGN PATENT DOCUMENTS

| | | |
|---|---|---|
| CN | 204963752 U | 1/2016 |
| CN | 108061651 A | 5/2018 |
| CN | 109186511 A | 1/2019 |
| JP | S61131821 A | 6/1986 |

\* cited by examiner

REFERENCE-LEVEL GEAR HELIX ARTIFACT

FIELD OF THE INVENTION

The present invention relates to a reference-level gear helix artifact for transferring gear helix value, which belongs to the field of the precision gear measurement technique.

BACKGROUND

The total helix deviation of the gear is one of the default inspect items. The gear helix artifact is used to calibrate helical measurement accuracy of gear measuring instruments, whose involute helicoidal surface is the standard for measurement instruments of the gear helix to transfer value of helical parameter, correct the instrument indication and determinate the indication error of the instrument and so on. The special plan for scientific and technological innovation in the field of advanced manufacturing technology of the 13th Five-year Plan, published by Ministry of science and technology of China in 14 Apr. 2017, specifies that make basic mechanical technology and key components be a priority in the 13th Five-year Plan, of which, design and precision manufacturing and measurement of reference-level gear involute and helix artifact is the key contents.

Base on the China National Standard GB\T 6468-2010 of the gear helix artifact, the accuracy class of the gear helix artifact can be divided into two classes, that is Class-1 and Class-2, among which, the reference-level gear helix artifact refer specifically to the gear helix artifact with Class-1 and above accuracy, which is used to transfer value of helical parameter of national class; the Class-2 gear helix artifact is called the standard gear helix artifact, which is used to deliver value of helical parameter of province or lab class. The reference-level gear helix artifact should meet the requirement of the Class-1 in the gear helix artifact national standard, which has at least an involute cylindrical surface and at least a pair of the involute helicoidal surfaces of the left and right tooth surface with the same helix angle. Besides, the tooth width of the gear helix artifact is greater than 90 mm and the involute length used to determinate base circle parameters is not less than 15 mm.

For the Class-1 gear helix artifact whose base radius is less than 100 mm, the tolerance requirement of the helix form deviation and helix slope deviation is less than 1.2 µm. For the Class-1 gear helix artifact whose base radius is longer than 100 mm but shorter than 200 mm, the tolerance requirement of the helix form deviation and helix slope deviation is less than is less than 1.5 µm. The surface roughness of the involute helicoidal surface is less than Ra 0.1 µm. Since the accuracy of the Class-1 gear helix artifact is very strict and there are no relevant products at home and abroad at present, the manufacturing technology of the Class-1 gear helix artifact still belong to international blank.

SUMMARY

In order to develop a reference-level gear helix artifact, the invention provides a reference-level gear helix artifact with high accuracy which can be easily obtained by the generating processing method.

The specific technical solution is as follows: a reference-level gear helix artifact with the global symmetric structure, whose spatial centroid point located at the geometric center of a gear helix artifact mandrel. A straight tooth groove, a left-hand tooth groove and a right-hand tooth groove are provided on the middle cylindrical surface of the reference-level gear helix artifact. The left-hand tooth groove and the right-hand tooth groove are arranged symmetrically to the straight tooth groove. Two symmetrical axial reference torus and two radial reference cylinders with the equal diameter are arranged on the shaft segments at both ends of the cylindrical surface of the gear helix artifact. The straight tooth groove includes an involute cylindrical surface of right tooth surface with 0° helix angle and an involute cylindrical surface of left tooth surface with 0° helix angle. The left-hand tooth groove includes an involute helicoidal surface of the left tooth surface with 15° helix angle and an involute helicoidal surface of the left tooth surface with 30° helix angle. The right-hand tooth groove includes an involute helicoidal surface of the right tooth surface with 15° helix angle and an involute helicoidal surface of the right tooth surface with 30° helix angle.

The position of the straight tooth groove, the left-hand tooth groove and the right-hand tooth groove in the cylindrical surface of the gear helix artifact are properly arranged and the diameter of the shaft segment of the A-end and B-end are optimized to ensure that the spatial centroid point of the entire reference-level gear helix artifact is located at the geometric center of the gear helix artifact mandrel. The characteristic of the structure of the gear helix artifact ensures the total mass balance in the process of machining, measuring and transferring the value of the gear helix artifact.

The two ends of the gear helix artifact mandrel are machined with symmetrical fine threads and center hole.

A relief with a radius of more than 5 mm is provided at the transition position between the involute cylindrical surfaces or the involute helicoidal surfaces and root circle of the gear helix artifact.

The radial reference cylinders at both ends of the gear helix artifact are also the reference of the design, machining and measurement of the gear helix artifact.

GCr15 or the material with similar property is selected as the material of the reference-level gear helix artifact. The surface hardness of the involute cylindrical surfaces and the involute helicoidal surfaces is not less than HRC60.

The beneficial effect of the invention are as follows: the present invention provides a reference-level gear helix artifact which includes the symmetric involute helicoidal surfaces with 0°, ±15° and ±30°, and the symmetric axial reference torus and radial reference cylinder. The spatial centroid point of the gear helix artifact is passed through the geometric center of the gear helix artifact, which ensure that the mass balance state during the processing, measurement and value transfer of the reference-level gear helix artifact. The reference-level helix gear artifact provided by the invention is of uniform in design, processing and measuring datum, symmetrical in structure and mess-balanced. The base discs can be installed at both ends to obtain high machining accuracy by the generating method.

Figure 1:
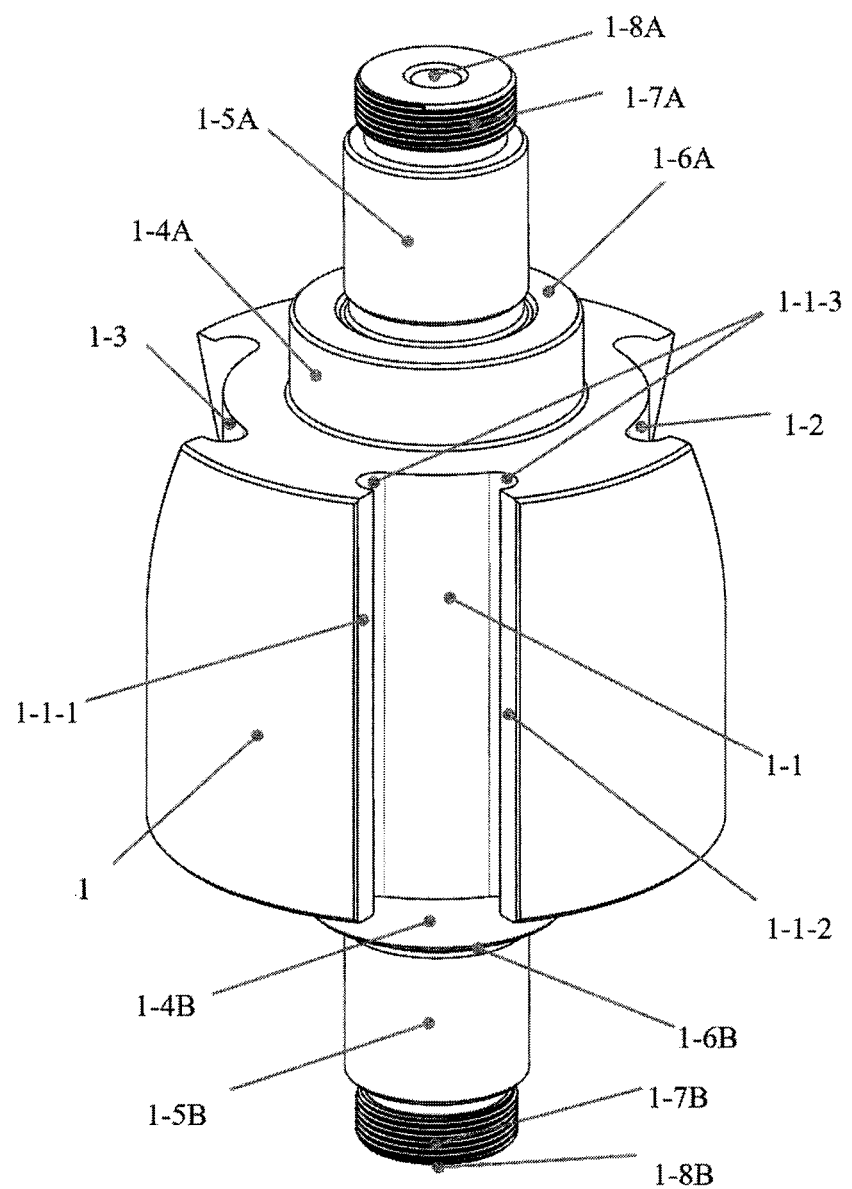
FIG. 1 illustrates the straight tooth groove of the gear helix artifact.
Figure 2:
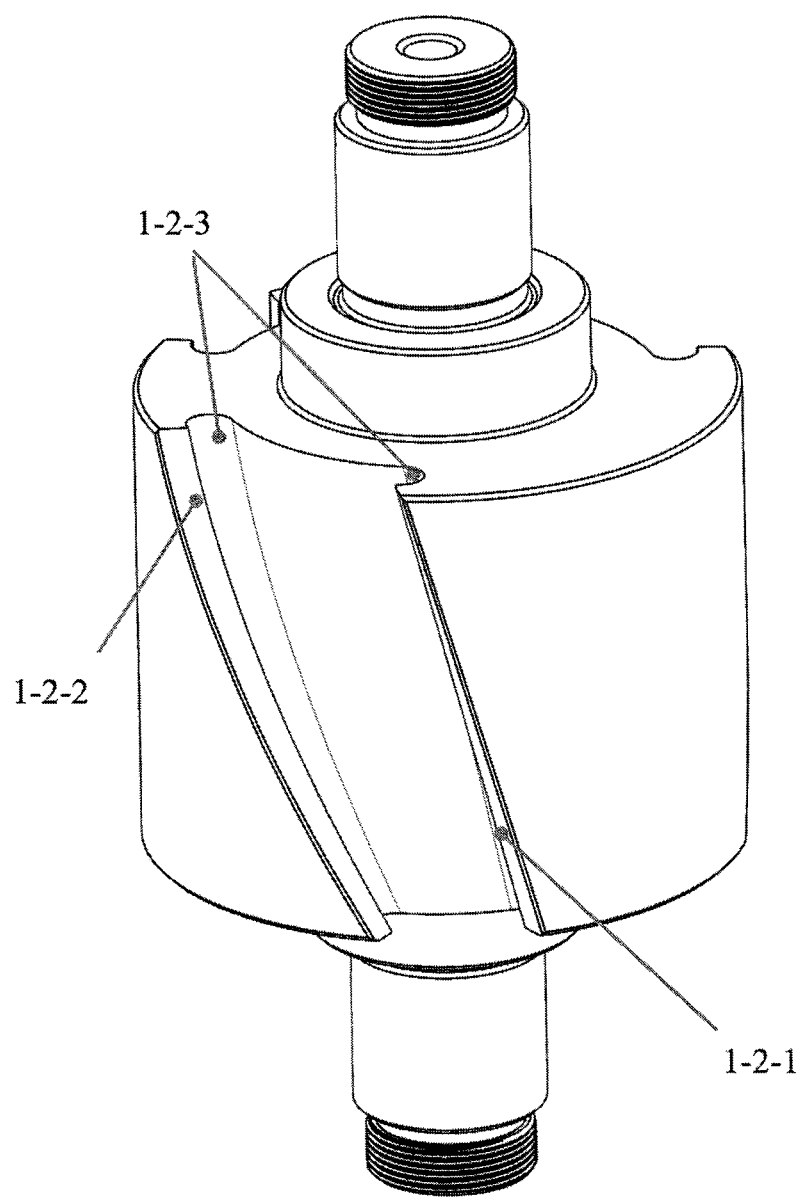
FIG. 2 illustrates the left-hand tooth groove of the gear helix artifact.
Figure 3:
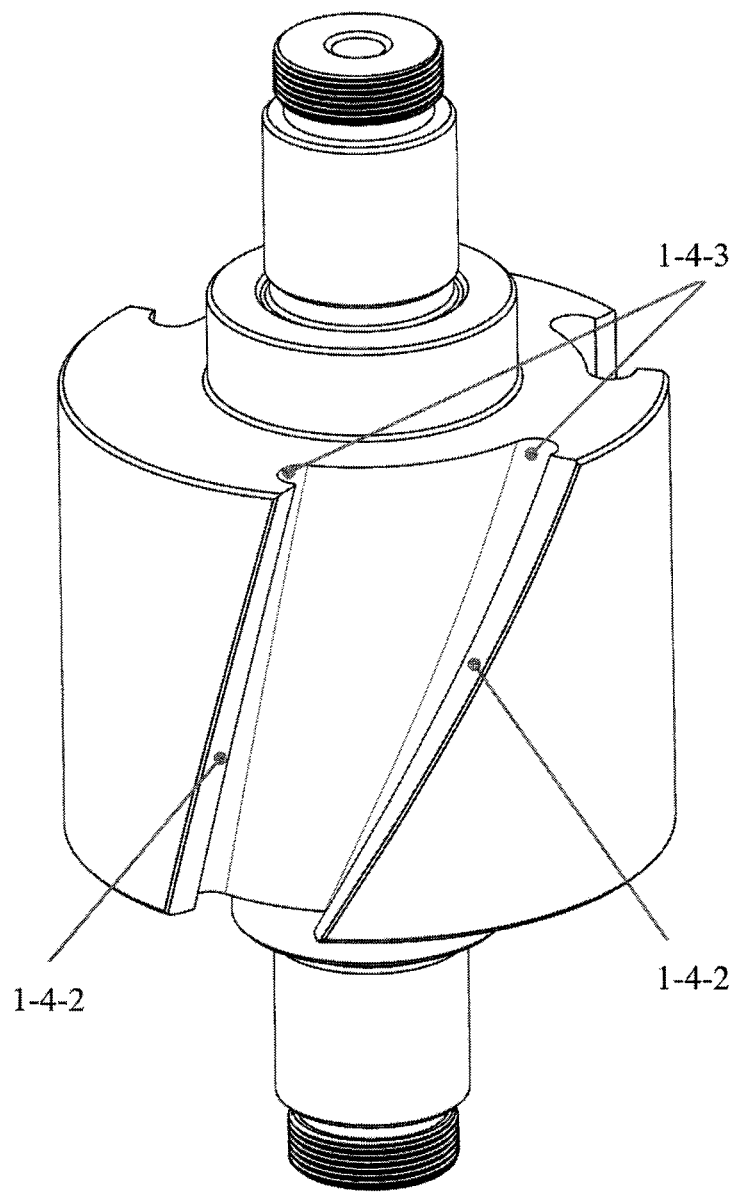
FIG. 3 illustrates the right-hand tooth groove of the gear helix artifact.

Wherein: 1 reference-level gear helix artifact; 1-1 straight tooth groove; 1-1-1 involute cylindrical surface of the right tooth surface with 0 degree helix angle; 1-1-2 involute cylindrical surface of the left tooth surface with 0 degree helix angle; 1-1-3 relief of the straight tooth groove; 1-2 left-hand tooth groove; 1-2-1 involute helicoidal surface of the left tooth surface with 15 degree helix angle; 1-2-2 involute helicoidal surface of the left tooth surface with 30 degree helix angle; 1-2-3 relief of the left-hand tooth groove; 1-3 right-hand tooth groove; 1-3-1 involute helicoidal surface of the right tooth surface with 15 degree helix angle; 1-3-2 involute helicoidal surface of the right tooth surface with 30 degree helix angle; 1-3-3 relief of right-hand tooth groove; 1-4A shaft segment of the A-end; 1-4B shaft segment of the B-end; 1-5A radial reference cylindrical surface of the A-end; 1-5B radial reference cylindrical surface of the B-end; 1-6A axial reference torus of the A-end; 1-6B axial reference torus of the B-end; 1-7A fine thread of the A-end; 1-7B fine thread of the B-end; 1-8A center hole of the A-end; 1-8B center hole of the B-end.

DETAILED DESCRIPTION

The design ideas and structural characteristics of the reference-level gear helix artifact 1 (hereafter referred as gear helix artifact), whose diameter is 120 mm and the tooth width is 100 mm, are expounded as follows.

The maximum diameter of the outer cylinder of the gear helix artifact is set as 126 mm, the involute cylindrical surfaces and the involute helicoidal surfaces start from the base cylinder, and the chamfer of the tooth top and root is no more than 0.5 mm to ensure the generating length of the gear helix artifact. There are three tooth grooves processed on the outer cylinder of the gear helix artifact, which are the straight tooth groove 1-1, the left-hand tooth groove 1-2 and the right-hand tooth groove 1-3. The straight tooth groove includes the involute cylindrical surface of the right and left tooth surface with 0° helix angle. The left-hand tooth groove includes an involute helicoidal surface with left-hand 15° helix angle and an involute helicoidal surface with left-hand 30° helix angle. The right-hand tooth groove includes an involute helicoidal surface with right-hand 15° helix angle and an involute helicoidal surface with right-hand 30° helix angle. On the A-end face of the outer cylinder of the gear helix artifact, a relief with radius of more than 5 mm is provided at the transition position between the involute cylindrical surfaces or the involute helicoidal surfaces and root circle which is tangent to the base circle of the gear helix artifact. In addition to reduce stress concentration, the relief is also beneficial to ensure the machining accuracy of the involute cylindrical surface and the involute helicoidal surface. The angles between the indexing circles of the three opposite tooth surfaces on the A-end are 15°. Observing from the A-end, the three tooth grooves along the clockwise direction are the straight tooth groove, the right tooth groove and the left tooth groove. The left and right grooves are arranged symmetrically to the straight groove. The angle between the left or right grooves and the straight grooves is 133.245°, which ensure that the centroid point perpendicular to the axial direction of the gear helix artifact passes through the geometric center of the artifact mandrel.

Since the left-hand tooth groove and the right-hand tooth groove are composed of the involute helicoidal surfaces with different helical angles, the width of left-hand tooth groove and right-hand tooth groove varies along the axis of the gear helix artifact, which results in that the center of centroid point of the largest cylindrical segment of the gear helix artifact is not in the geometric center of the mandrel. By adjusting the diameter difference between the shaft segment A and B of the gear helix artifact, the centroid point deviation of the maximum cylindrical segment of the gear helix artifact can be balanced. If the distance between the axial reference torus of the A-end 1-6A and the axial reference torus of the B-end 1-6B is set as 140 mm, and the shaft segment of the A-end 1-4A is 57 mm, then the shaft segment of the A-end 1-4B is 64 mm, the spatial centroid point of the gear helix artifact can be located at the geometric center of the artifact mandrel.

With respect to the central hole at both ends, the yaw error and the parallelism error of the axial reference torus of the A-end and B-end is no more than 0.2 μm. Both ends of the radial reference cylinder have the same length, whose diameter is 40 mm, and the diameter difference of them is no more than 1 μm, the cylindricity is no more than 0.5 μm, the surface roughness is no more than Ra 0.2 μm, and the radial run out to the two central hole is no more than 1 μm.

The two center holes are B-type center holes with protective cone; the taper of the center hole is $60°°_{-2}$; the roundness is no more than 0.4 μm and the surface roughness is no more than Ra 0.2 μm.

The material of the gear helix artifact is GCr15 or the material with similar property. The surface hardness of the cylindrical surfaces and involute helicoidal surfaces are no less than HRC60.

In addition to the conical surfaces of the center hole, the thread surfaces, the reference cylindrical surfaces, the reference torus surfaces, the involute cylindrical surfaces and the involute helicoidal surfaces, the other surfaces of the gear helix artifact are sandblasted and chrome-plated.

The invention claimed is:

1. A reference-level gear helix artifact, wherein, the reference-level gear helix artifact has the global symmetric structure, whose spatial centroid point located at the geometric center of a gear helix artifact mandrel; a straight tooth groove, a left-hand tooth groove and a right-hand tooth groove are provided on the middle cylindrical surface of the reference-level gear helix artifact; the left-hand tooth groove and the right-hand tooth groove are arranged symmetrically to the straight tooth groove; two symmetrical axial reference torus and two radial reference cylinders with the equal diameter are arranged on the shaft segments at both ends of the cylindrical surface of the gear helix artifact; the straight tooth groove includes an involute cylindrical surface of right tooth surface with 0° helix angle and an involute cylindrical surface of left tooth surface with 0° helix angle; the left-hand tooth groove includes an involute helicoidal surface of the left tooth surface with 15° helix angle and aninvolute helicoidal surface of the left tooth surface with 30° helix angle; the right-hand tooth groove includes an involute helicoidal surface of the right tooth surface with 15° helix angle and an involute helicoidal surface of the right tooth surface with 30° helix angle.

2. The reference-level gear helix artifact according to claim 1, wherein two ends of the artifact mandrel are machined with symmetrical fine threads and center hole.

3. The reference-level gear helix artifact according to claim 1, wherein a relief with a radius of more than 5 mm is provided at the transition position between the involute cylindrical surfaces or the involute helicoidal surfaces and root circle of the gear helix artifact.

4. The reference-level gear helix artifact according to claim 1, wherein the material of the reference-level gear helix artifact is GCr15, and the surface hardness of the involute cylindrical surfaces and the involute helicoidal surfaces is not less than HRC60.

5. The reference-level gear helix artifact according to claim 1, wherein, the specific parameters of the reference-level gear helix artifact with a pitch diameter of 120 mm and a tooth width of 100 mm are the maximum diameter of the outer circle of the artifact is set as 126 mm, the involute cylinder and involute helix started from the base cylinder and the chamfer of the tooth top and root is no more than 0.5 mm; observing from the A-end, the three tooth grooves along the clockwise direction are the straight tooth groove, the right tooth groove and the left tooth groove; the left and right grooves are arranged symmetrically to the straight groove; the angle between the left or right grooves and the straight grooves is 133.245°, which ensure that the centroid point perpendicular to the axial direction of the gear helix artifact passes through the geometric center of the artifact mandrel.

6. The reference-level gear helix artifact according to claim 5, wherein, the distance between the axial reference torus at the A-end and the axial reference torus at the B-end is 140 mm, the diameter of the shaft segment at the A-end is 57 mm, and the diameter of the shaft segment at the B end is 64 mm, ensuring that the spatial centroid point of the artifact is located at the geometric center of the artifact mandrel;

with respect to the central hole at both ends, the yaw error of the axial reference torus of the A-end and B-end is no more than 0.2 µm; both ends of the radial reference cylinder have the same length, whose diameter is 40 mm, and the diameter difference of them is no more than 1 µm, the cylindricity is no more than 0.5 µm, the surface roughness is no more than Ra 0.2 µm, and the radial run out to the two central hole is no more than 1 µm;

the two center holes are B-type center holes with protective cone; the taper of the center hole is $60^{o^0}_{-2}$; the roundness is no more than 0.4 µm and the surface roughness is no more than Ra0.2 µm.

* * * * *